Figure 1:
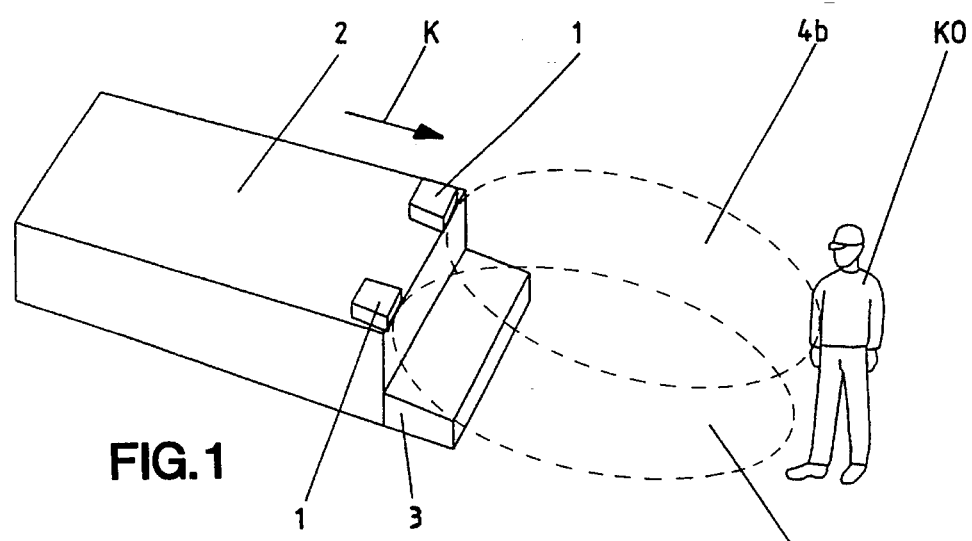

United States Patent [19]
Heinonen et al.

[11] Patent Number: 5,541,403
[45] Date of Patent: Jul. 30, 1996

[54] METHOD IN AN OPTICALLY OPERATED PROXIMITY SWITCH

[75] Inventors: Ilkka Heinonen, Tampere; Markku Hellsten, Forssa; Timo Malm, Tampere, all of Finland

[73] Assignee: Mitron Oy, Forssa, Finland

[21] Appl. No.: 211,301

[22] PCT Filed: Sep. 30, 1992

[86] PCT No.: PCT/FI92/00261

§ 371 Date: Mar. 30, 1994

§ 102(e) Date: Mar. 30, 1994

[87] PCT Pub. No.: WO93/07511

PCT Pub. Date: Apr. 15, 1993

[30] Foreign Application Priority Data

Sep. 30, 1991 [FI] Finland ..................................... 914598

[51] Int. Cl.⁶ ..................................................... G01V 9/04
[52] U.S. Cl. ............................................ 250/221; 340/556
[58] Field of Search .................................. 250/221, 222.1, 250/214 SW; 340/555–557; 356/375

[56] References Cited

U.S. PATENT DOCUMENTS

| | | | |
|---|---|---|---|
| 4,434,363 | 2/1984 | Yorifuji et al. | 340/556 |
| 4,532,867 | 8/1985 | Mitchell . | |
| 4,709,142 | 11/1987 | Dahl . | |
| 4,899,041 | 2/1990 | Fetzer et al. . | |
| 4,973,837 | 11/1990 | Bradbeer | 250/221 |
| 5,099,113 | 3/1992 | Oi et al. | 340/556 |

FOREIGN PATENT DOCUMENTS

| | | |
|---|---|---|
| 0441555A2 | 8/1991 | European Pat. Off. . |
| 3311578C1 | 8/1984 | Germany . |
| 3627972A1 | 2/1988 | Germany . |
| 451509 | 10/1987 | Sweden . |
| 458479 | 4/1989 | Sweden . |
| WO93/07511 | 4/1993 | WIPO . |

*Primary Examiner*—Stephone B. Allen
*Attorney, Agent, or Firm*—Pollock, Vande Sande & Priddy

[57] ABSTRACT

The invention relates to a method in an optically operated proximity switch. A transmitter means is used to transmit a beam in a direction into the environment. The detection zone on one hand and the background area on the other hand are monitored by receiving means. In addition, processing means are used in the method by which the output signals of the receiving means are compared to monitor the situation in the detection zone. An object is detected by the processing means when the output signal of the first receiver means monitoring the detection zones is changed in relation to the output signal of the second receiver means monitoring the background. When the said change is ended, the phase of detection of the object is ended and the output signal of the first receiver means is returned to a substantially original level.

8 Claims, 4 Drawing Sheets

METHOD IN AN OPTICALLY OPERATED PROXIMITY SWITCH

The invention relates to a method in an optically operated proximity switch having at least one transmitter means for generating and sending a beam into the environment of the proximity switch in a first direction. The proximity switch is fitted with two groups of receiver means, both groups comprising at least one receiver means. According to the method, the receiver means of the first group are directed at least in one second direction deviating from the first direction in a way that the receiving direction of each receiver means intersects the beam of the transmitter means in the detection zone in the environment of the proximity switch. Thus the receiver means of the first group receive emission which is reflected from an object possibly in the detection zone, or scanning region, and derived from emission from the transmitter means. Further, according to the method, the receiver means of the second group are arranged to receive emission coming and/or reflected back from the background outside the detection zone of the proximity switch. In addition, processing means are used in the method by which the output signals of the receiver means of the first and second groups are processed and compared to monitor the situation in the area of the proximity switch.

A method similar to that presented above is in its essential parts known from the solution disclosed in U.S. Pat. No. 4,899,041. According to the publication, the proximity switch is fitted with lense systems arranged on both sides of the transmitter means, through which the emission reflected from the detection zone and from the background is reflected by a mirror arrangement on three parallel receivers. The two outer receivers receive the emission which is collected by the said lense system and correlates to the situation in the detection zone; correspondingly, the central receiver receives the emission which correlates to the situation in the background. Furthermore, the proximity switch is fitted with an electronic circuit for processing output signals from the said receivers for determination of the situation in the detection zone.

As described above, the method according to U.S. Pat. No. 4,899,041 with its technical application is based on utilizing lense optics and mirrors. A solution of this kind has the disadvantages of the high price of optics, the dependency of the optical properties on environmental conditions, and the regular service required of the optics. Moreover, the precise directing obtained by the lenses often results in a narrow cone of detection. Converging lenses can be used to obtain a longer distance of detection, but the detection zone becomes narrower, whereas diverging lenses (mirrors) can be used to obtain a wider detection zone, but the distance of detection becomes shorter. It is, of course, possible to extend and limit the distance of detection obtained by optical lenses either by increasing the radiation intensity of the transmitter means or by widening the light collection surface of the receiver means, whereby the emission entering the sensor of the receiver means increases in proportion to the surface areas of the lense and the sensor. The relative signal level of the sensor of the receiver means is high only when the optical emission is received by the sensor directly or at an angle of not more than a few degrees. It is clear that using either of the ways mentioned above, also the radiation transmitting and receiving angles become more narrow. It is also obvious that the use of lenses involves other problems in practice, in addition to the narrow detection zone. In particular, the properties of the lenses are vulnerable to changes in the environment. Consequently, dust collected and water possibly condensed on the surface of the lenses reduce the intensity and may change the focus of the lense, thus weakening the reliability of the detection of the object. In addition, high temperature changes and the weakening of the optics of the lense due to e.g. scratching as well as possible displacing of the lenses due to inertial forces, such as impacts or collisions, acting on the proximity switch change the optical properties, such as the focus and intensity, of the lense system and thus the sensitivity of the proximity switch. Therefore, for example in the method according to U.S. Pat. No. 4,899,041, in which optical lenses are used, the reliable operation of the proximity switch must be secured by service of the lenses at regular intervals, because a dirty and/or defective lense may prevent the detection of an object in the detection zone. It must be noted in this context that in many practical applications of optical lenses, a resistance arrangement needs to be placed in connection with the optics for heating the lenses to prevent condensation of moisture. Furthermore, many practical applications involve a separate glow diode arrangement for detecting the degree of impurity of the lenses. In addition to problems involved by lense optics, the solution according to U.S. Pat. No. 4,899,041 also involves similar problems with the mirror arrangement.

It has been a common problem with optical proximity switchs that the distance of detection is strongly dependent on the the reflection coefficient of the object. This, in turn, is strongly dependent on the material, colour and surface properties of the object. In addition, the distance of detection is substantially affected by the size of the reflecting object and by the impurity of the air, as mentioned above. As an example of the relative material and colour dependency of the detection distance of an optical proximity switch, the following coefficients can be mentioned at the wavelength of ca. 1 µm: glossy metal, 3.0; white paper, 1; and black cardboard, 0.1. Consequently, this involves a factor of the detection distance with differences ranging over several decades.

The purpose of the invention is to present a method in an optically operated proximity switch which removes to a high degree the problems related to the prior art as presented above. For attaining this purpose, the method according to the invention is primarily characterized in that the receiver means of the second group are directed to at least one third direction in a way that the receiving direction of each receiver means intersects the beam of the transmitter means in the zone of the background outside the detection zone and/or is parallel to the beam directed in the first direction of the transmitter means, whereby the receiver means of the first and second groups each receive directly the separate emission, on the one hand derived and/or reflected from the detection zone, and on the other hand derived and/or reflected from the background, in that the object placed in the detection zone is detected on the basis of comparison of the output signals of the said groups by processing means when the output signal of the receiver means of the first group is changed in relation to the output signal of the receiver means of the second group, and in that the stage of detection of the object is ended on the basis of the comparison by the processing means when the output signal of the receiver means of the first group returns to the level before the detection in relation to the output signal of the receiver means of the second group.

Consequently, the solution presented above gives the advantage that the proximity switch operated according to the invention can be used to eliminate almost totally the effect of the material and colour of the object on the distance of detection. Using the method of the invention, the substantial reduction of the effect of the material and the colour is primarily based on the fact that all the time, the processing means are used for comparing the difference between the output and transmit signals only. In the method, no fixed detection limit is used, but an object is detected in the detection zone on the basis of a relative change between the output signals in a time unit. As a further advantage of the method, it can be mentioned that light detectors with an integrated (enclosed) lense structure for obtaining optical properties can be used as the transmitter means and the receiver means, but a separate lense structure need not be used. Thus the disadvantages involved in all the said optical structures, as described above, can thus be largely avoided by using a proximity switch of the invention.

Some advantageous embodiments of the method are presented in the appended dependent claims.

Figure 4A:
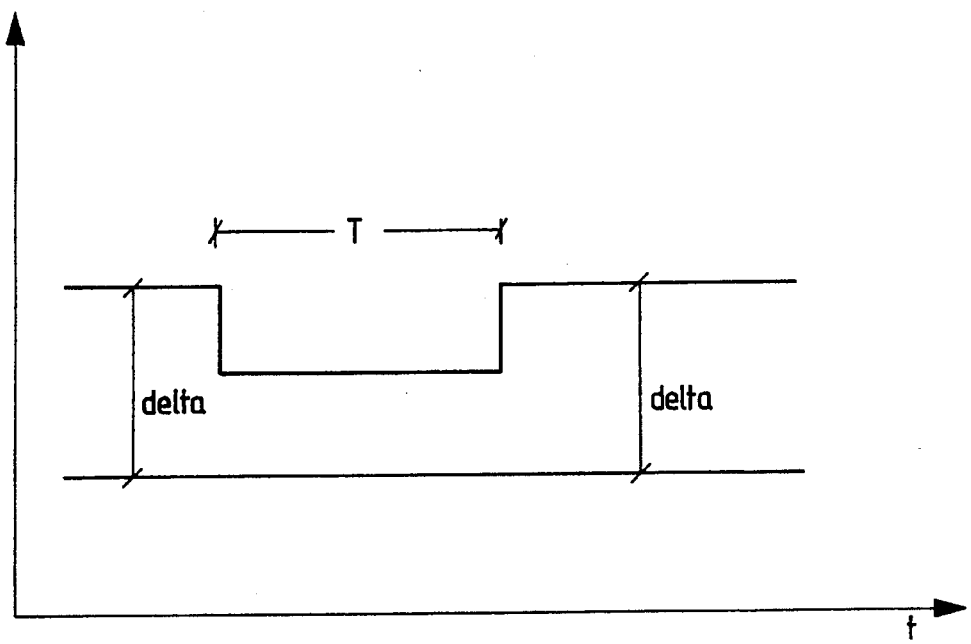
Figure 4B:
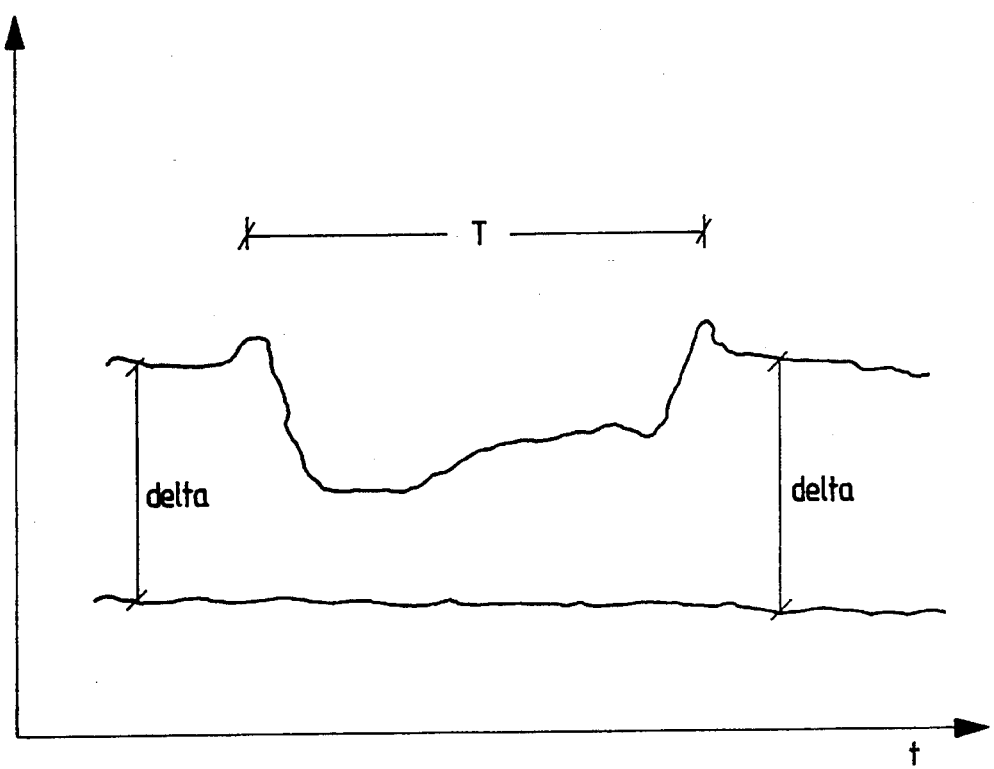
Figure 5:
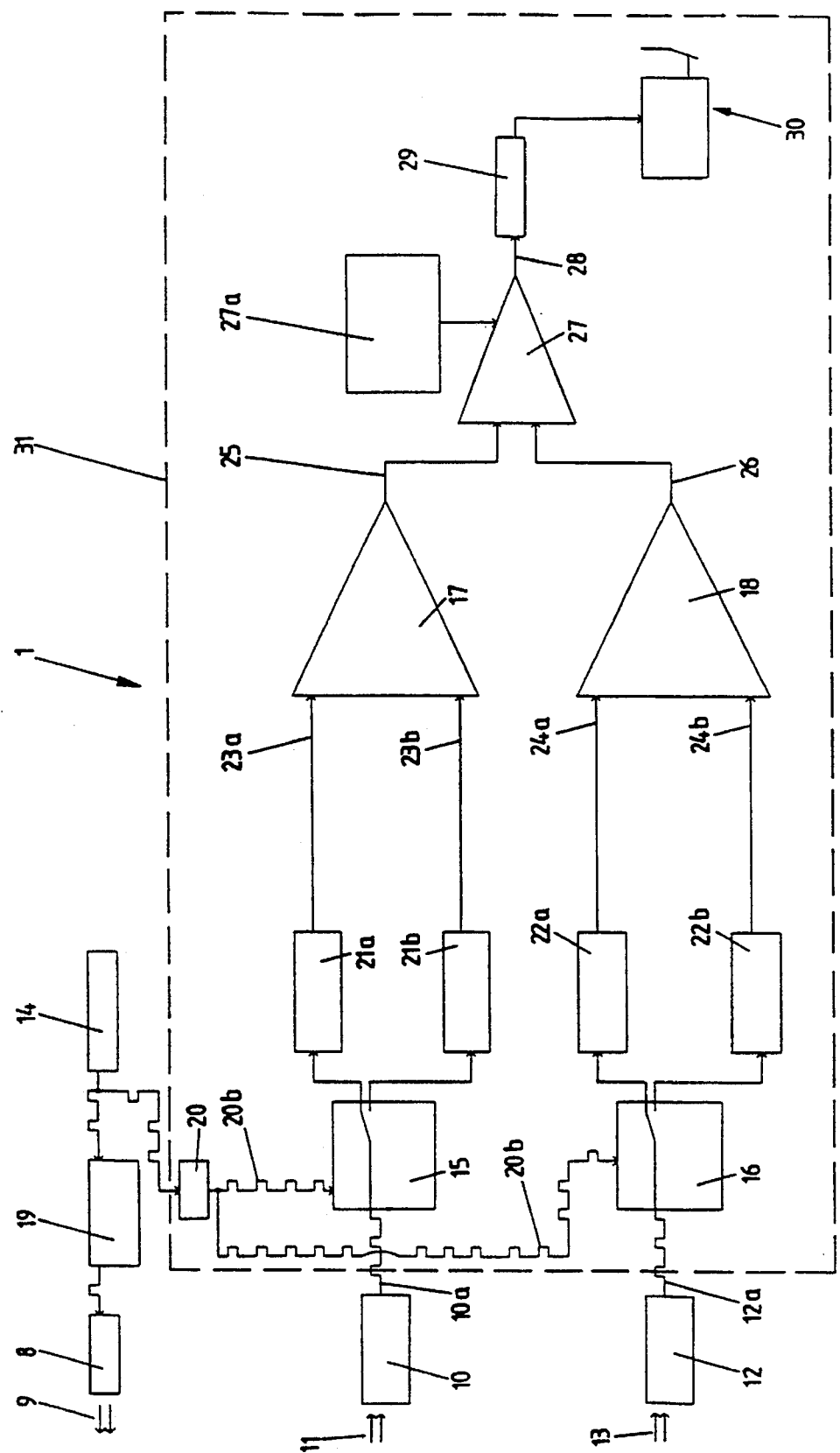

The invention is illustrated in more detail in the following description with reference to the example shown in the appended drawings. In the drawings, FIG. 1 shows a schematic perspective view of an application of the method of the invention in a safety device of a car with automatic control, FIG. 2 shows an application of the method in a safety device of an industrial robot, FIGS. 3a and b show the principle of operation of the method in schematic form, FIGS. 4a & b show schematically the time dependency relations of the transmit signals of the receiver means of the first and second groups in a detecting situation, whereby FIG. 4a shows an ideal situation during detection of an object [cf. points 25 (upper curve) and 26 (lower curve) in FIG. 5] and FIG. 4b shows in practice a corresponding situation in a circuit according to FIG. 5 measured with an oscilloscope, and FIG. 5 shows a schematic diagram of the proximity switch according to the invention.

In the embodiment shown in FIG. 1, two proximity switchs 1 operated according to the method are placed in the front part of an automatically controlled car 2, such as an automatically guided vehicle, above a safety buffer 3. Each proximity switch 1 has a detection zone 4a, 4b. The detection zones are directed to monitor the situation in the direction of motion (arrow K) of the automatically controlled car 2, whereby the proximity switchs 1 are coupled with the control system of the automatically controlled car 2 in a way that the object KO, such as a man in FIG. 1, entering either of the detection zones 4a, 4b induces on basis of a detection an operation in the control system of the automatically controlled car which in this case stops the automatically controlled car for security reasons.

Figure 2:
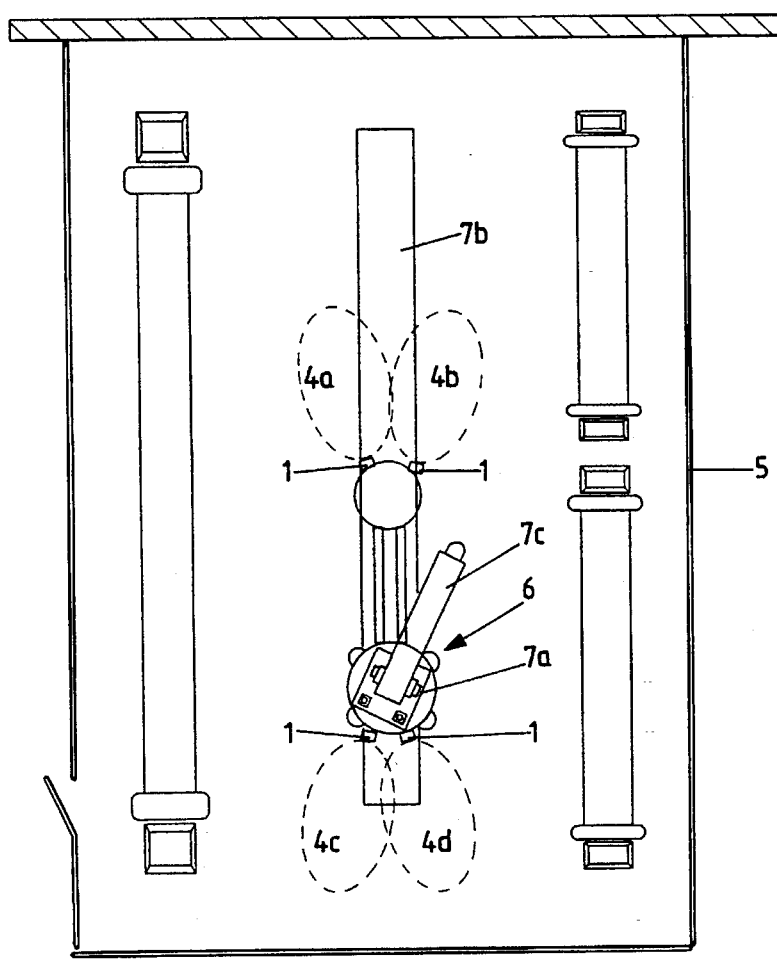

FIG. 2 illustrates a solution similar to that in the automatically controlled car shown in FIG. 1, in which four proximity switchs 1 are placed in connection with the moving frame 7a of an industrial robot 6 placed in a production unit 5. The moving frame 7a moves along a track 7b and performs e.g. welding work with its arm 7c. The proximity switchs 1 monitor each the directions of motion of the robot in a way that an object entering any of the detection zones 4a–d induces stopping of the operations of the moving frame 7 of the industrial robot also in this case for security reasons.

Figure 3A:
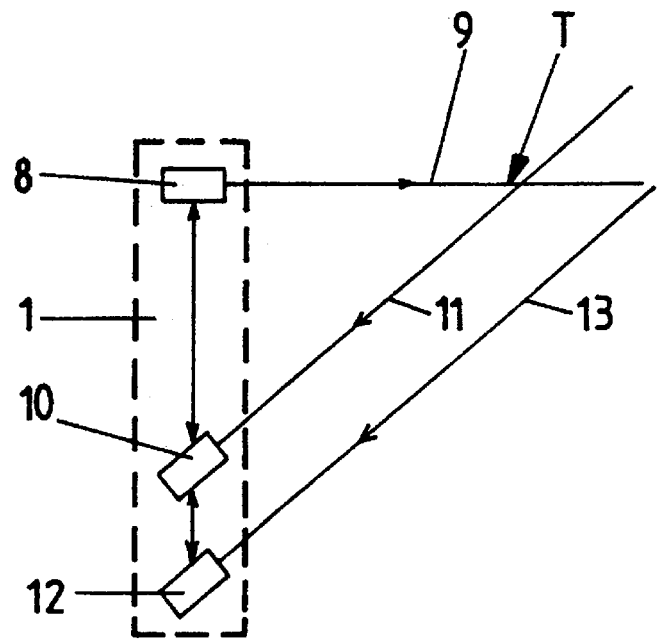
Figure 3B:
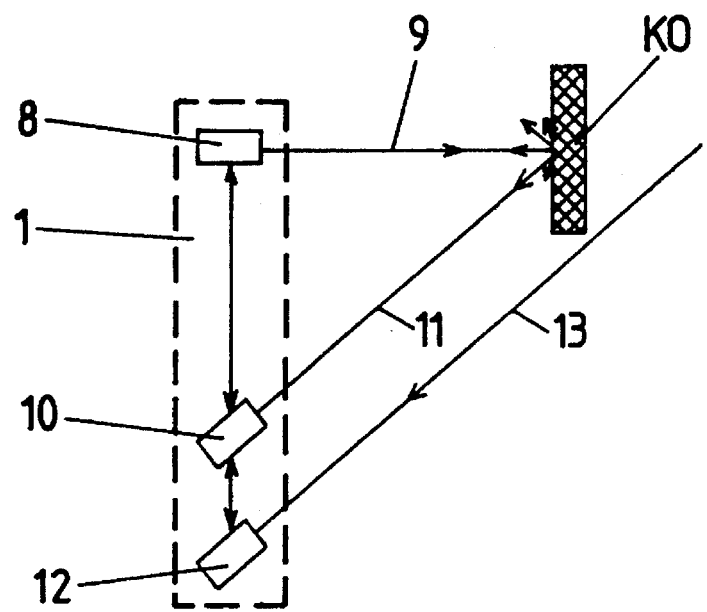

FIGS. 3a, 3b illustrate an embodiment of the method. A transmitter means transmits a beam in the first direction 9 which is illustrated by a line denoting the central axis of the beam. In the embodiment shown in FIG. 3, two receiver means are used, whereby the first group consists of one receiver means 10 whose receiving direction 11 is arranged to deviate from the the first direction 9 in a way that the said second receiver direction 11 intersects the beam of the transmitter means in the detection zone (point T in FIG. 3a). The second groups consists also one receiver means 12 whose receiving direction 13 (third) is directed to monitor the zone of the background outside the detection zone. FIG. 3b illustrates a situation in which the first receiver 10 receives emission reflected from the object KO and the second receiver means 12, in turn, reflection derived and/or reflected from the background. In a situation of this kind, an object in the detection zone is naturally detected according to the invention on basis of the relative change of the output signals of the first 10 and second 12 receiver means in the electric circuit according to FIG. 5. The circuit shown in FIG. 5 controls the operations of the device or equipment (e.g. the devices shown in FIGS. 1 and 2) fitted with the proximity switch for monitoring the environment of the said device or equipment. The proximity switch operating according to the invention detects the object as a result of a relative change in the output signals, usually the output voltage, of the receiver means. The second receiver means directed at the background forms a "floating" test level with the purpose of compensating the effect of the background, the material and colour of the object as well as the emission of the transmitter means, in practical solution particularly the change of intensity of infrared light. The floating test level thus improves the reliability of the detection and reduces the strong colour dependency of the detection distance. For minimizing default lights of the background, the reliability of the detection is further improved by directing the transmitter means and the receiver means suitably with respect to each other. Particularly in applications where the method is used in equipment shown in FIGS. 1 and 2, the first receiver means 10 are directed, as shown in FIGS. 3a, 3b, in a way that the optical axis (second receiving direction 11) of the receiver means intersects the optical axis (first direction 9) of the transmitter means 8 typically at a distance of 50 cm to 2 m from the transmitter means 8. The second receiver means 12 are directed in a way that their optical axis (third receiving direction 13) intersects the optical axis of the transmitter means 8 typically at a distance greater than 2 m or it is parallel to the optical axis (first direction 9) of the transmitter means 8. The first receiver means 10 are typically placed at a distance of 0–5 cm from the first receiver means farther away from the transmitter means 8 than the first receiver means 10. There can be several first and second receiver means 10, 12, and they can be placed around the transmitter means 8 in the same plane or on a cambered surface. It is naturally clear that in each single case, the distances, angles and other geometric features given above must be determined experimentally as required by the application in question.

FIG. 4a illustrates the effect of an object KO being ideally within the detection zone on the output signal 25 (T) from an integrator 21a. In a situation when there is no detection, the level difference between the output signals 10a and 12a remains substantially constant and independent of the intensity of the output signals; i.e. changes in the background and in the detection zone may change the intensity of the output signals at least to some extent, but the difference (delta) between them remains substantially constant. The object KO having left the detection zone, the output signal 10a substantially returns to the value before the detection in relation to the output signal of the second receiver means 12, whereby the difference (delta) also returns to the corresponding value.

FIG. 4a illustrates the curves corresponding to the results in practice as measured by an oscilloscope from the circuit according to FIG. 5.

It must be noted that the difference (delta) is in most practical applications 0, but for the sake of clarity, FIG. 4 is drawn so that the output signals 10a, 12a are separate.

In particular, the schematic diagram according to FIG. 5 is described in more detail with reference to the following example on an itemized technical embodiment.

1. Transmitter means

The transmitter means 8 consists of two GaAlAs LEDs (Honeywell SEP 8709-304) in series, the 1.5 A current flowing through the same being controlled with a Darlington power transistor 19 which, in turn receives a base current from an oscillator 14 (timer circuit TI 555). Using two LEDs, the same current can be used for obtaining double luminosity. The diodes forming the transmitter means 8 transmit pulsed infrared light with a narrow cone, 20°, and a wavelength of 880 nm at a power of 55 mW/cm$^2$.

The length of the pulse is 10 μs, and the pulse ratio (operating cycle ratio) is 1:16. The pulse ratio and the pulse length can be adjusted, when needed, by means of diodes and an adjustable resistor connected to the timer circuit (not shown in FIG. 4), particularly in the range between 1:1 and 1:20. With pulses in the order of a microsecond or less, the direct-current values of the infrared diode can be exceeded even 10 times, if the pulse ratio is less than 1:10, and the transmitting capacity of the diodes can thus be increased. In this short time, the thermal losses of the infrared diode do not even out to the environment by convection and thermal conduction through the conductors of the diode. With high currents, however, the aging of the diode is substantially accelerated. If the pulse ratio is high, the maximum average dissipation power is a limiting factor, irrespective of the pulse length. The longer the pulse, the less can the peak power be raised from the direct-current value by decreasing the pulse ratio.

2. Receiver means

The reception 10 and 12 is synchronized with the transmitter means 8 by coupling circuits 15 and 16. Because the receiver means 10 and 12 only receive light during the transmitting pulse, the effect of background lights is minimized and the signal-noise ratio of the receiver means increases.

Both receiver means 10 and 12 have detection of infrared light by two Si light diodes connected in parallel and preloaded in the reverse direction, with a cone width of 18°. Parallel connection is used for increasing the photosensitive surface area and thus photosensitivity. The maximum sensitivity of the Si light diode, 60 μA/mW/cm$^2$ at an intensity of radiation of 5 mW/cm$^2$, is close to the transmitting wavelength 880 nm of the GaAlAs LED.

In addition, the receiver means 10 and 12 have a small-size amplifier (Texas Instruments TI TLC272CP), an analogous coupling (Harris HI-303-5) controlled by a time delay circuit (Toshiba 74HC132P) with a delayed transmitting pulse, two RC integrators before an instrumentation amplifier (TI TLC274CN). The activation of the receiver means 10 and 12 by the object or by a disturbance light is displayed by a red LED light.

From the amplifyers of the receiver means 10 and 12, the output or incoming signals 10a, 12a are transmitted by means of (two) coupling circuits 15 and 16, by which the signals 10a, 12a received during the transmitting pulse are directed to first condensator circuits 21a, 22a (C=330 nF), and by means of control signals 20b coming from the oscillator 14 through the time delay circuit 20 during a rest period to second condensator circuits 21b, 22b (C=330 nF) through resistances (R=100 kΩ). The said output signal 10a, 12a is averaged with a time constant RC (RC=3.3 ms) to the condensators of the circuits 21a, 22a, in which a voltage proportional to the average signal level (transmit signal) of pulses from the amplifier is induced. By means of averaging, even a very weak signal can be distinguished from noise. The signal-noise ratio of an assembled device is improved by averaging by a coefficient of $\sqrt{(2RC/t)}=28$, in which t is the time of 8 μs of switching off during the pulse.

In the first condensator circuit 21a, which is connected to the receiver means 10 directed at a detection distance, a voltage is induced in relation to the infrared light reflected from the object, the object being in the detection zone, and a voltage proportional to the intensity of the background light only is induced in the second condensator circuit 21b. If there is no object in the detection zone, both condensator circuits 22a, 22b have equally low voltages. In the condensators 22a, 22b connected to the receiver means 13 directed to the background, equally low voltages are induced by the background, irrespective of whether the object is in the detection zone or not.

Two instrumentation amplifiers 17 and 18 are used for comparing the voltages of condensator pairs 21a, 21b on one hand and 22a, 22b on the other hand with each other. The transmitting voltage of the instrumentation amplifier 17 is 0 V, if its inlet voltages 23a, 23b are equal, i.e. the said receiver means 10 does not detect an object. If there is an obstacle in the detection zone of the receiver means 10, a voltage with a higher absolute value is induced at the inlet 23a than at the inlet 23b, whereby the output 25 of the instrumentation amplifier 17 is proportional to the inlet voltage difference. Correspondingly, the voltages are equal at the inlets 24a and 24b of the instrumentation amplifier 18 when there is no object in the vicinity of the detection zone. Thus a so-called floating reference level is obtained, on which the reflection coefficients do not affect the control operations of the proximity switch.

3. Comparator and relay circuit

A comparator 27 including a control circuit 27a for fine adjustment of the zero point and the distance (TI TLC272CP) is used for comparing the signals proportional to the output signals (DC ouput voltage levels) of the receiver means 10 and 12 with each other. If the signals (outputs 25 and 26) are inequal (in practice, the output 25 of the instrumentation amplifier 17 exceeds the output 26 of the instrumentation amplifier 18), the object is within the detection distance, whereby the state of the comparator output 28 is changed. Thus, the output signal of the receiver means 12 directed to the background, modified by parts 16, 22a, 22b, 18, 27 of the processing means, forms a so-called floating reference level for the output signal of the receiver means 12 functioning as the actual coupling, which signal is modified by parts 15, 21a, 21b, 17, 27 of the processing means. There is a barrier voltage of ca. 1 V between the inlet poles of the comparator 27. This barrier voltage can be adjusted to change the detection distance. A pulse is given by the comparator to a one-shot circuit 29 (Toshiba TC74HC132P) which affects the actuators of the device or equipment connected with the proximity switch, e.g. switches on the relay device 30 (e.g. Siemens ZW) and keeps it on until the object has exited the detection zone.

In order to explain the meaning of terms used in the description and claims, it is noted that the directions 9, 11 and 13 refer to the imaginary straight line (optical axis) on which the intensity of the emission or the emission receiving capacity reaches its maximum value. A beam refers to the volume, in principle with a conical shape, within which the intensity of the emission, the said direction as its central axis, is higher than half the maximum value at the said point of the said line.

In a generally known way, the intensity of an emission is reduced in inverse relation to the square of the distance, and, correspondingly, the intensity of a reflected emission is inversely proportional to the fourth power of the distance. The processing means comprise the parts shown in the area limited by a broken line 31 in the example according to FIG. 4. The output signal 10*a*, 12*a* refers to electric pulses manipulated and amplified in the receiver means and being transmitted to the coupling circuits 15 and 16 which are part of the processing means.

What is claimed is:

1. Method in an optically operated proximity switch, in which a beam is generated and transmitted into the environment of the proximity switch by at least one transmitter means in a first direction, two groups of receiver means are fitted with the proximity switch, both groups comprising at least one receiver means, the receiver means of the first group is/are directed at least in one second direction deviating from the first direction in a way that the receiving direction of each receiver means intersects the beam of the transmitter means in the detection zone in the environment of the proximity switch, whereby the receiver means of the first group is/are capable of receiving emission which is reflected from an object in the detection zone and derived from emission from the transmitter means, the receiver means of the second group is/are arranged to receive emission coming and/or reflected back from the background outside the detection zone of the proximity switch, processing means are used in the method by which the output signals of the receiver means of the first and second groups are processed and compared to monitor the situation in the area of the proximity switch, wherein the receiver means of the second group is/are directed to at least one third direction in a way that the receiving direction of each receiver means intersects the beam of the transmitter means in the zone of the background outside the detection zone and/or is parallel to the beam directed in the first direction of the transmitter means, whereby the receiver means of the first and second groups each receive directly the separate emission, on the one hand derived and/or reflected from the detection zone, and on the other hand derived and/or reflected from the background, the object placed in the detection zone is detected on the basis of comparison of the output signals of the said groups by processing means when the output signal of the receiver means of the first group is changed in relation to the output signal of the receiver means of the second group, and the stage of detection of the object is ended on the basis of the comparison by the processing means when the output signal of the receiver means of the first group returns to the level before the detection in relation to the output signal of the receiver means of the second group, characterized in that a beam is generated and transmitted in the first direction as a pulse, and that the reception of the first and the second group is synchronized to receive emission that is possibly reflected from the said beam in pulse form.

2. A method according to claim 1, characterized in that the receiver means of the second group is/are directed to at least one third direction deviating from the first and the second direction.

3. A method according to claim 1, characterized in that the output signals of the first and/or the second group are transmitted for averaging of the output signals to averaging circuits, separate for each group, placed in the processing means.

4. A method according to claim 1, characterized in that the output signals from the receiver means of the first and the second group are directed to the corresponding coupling circuits in the processing means, that the operation of the coupling circuits is controlled in a way that the said output signal is directed to the first averaging circuit connected to the said coupling circuit during transmitting of the beam to be transmitted in pulse form in the first direction, that the operation of the coupling circuits is further controlled in a way that the said output signal is directed to the second averaging circuit connected to the said coupling circuit during the rest period of the beam to be transmitted in pulse form in the first direction, that instrumentation amplifiers are used to compare the voltages of the two averaging circuits connected to the said coupling circuit with each other, whereby the outputs of the said instrumentation amplifier receive the value zero (OV) if the voltages in the said two averaging circuits are equal and a value different from zero if they are inequal, and that a comparator is used to compare the values of the outputs of the instrumentation amplifiers, whereby, the values being inequal, the state of the comparator is changed by a switch connected to the comparator for performing the operations required by the object in the detection zone.

5. A method according to claim 1, characterized in that a pulse ratio between 1:1 and 1:20 is used, where the ratio denotes the magnitude transmitting phase:rest phase.

6. A method according to claim 4, characterized in that the coupling circuits are controlled by means of control from the oscillator operating the transmitter means, particularly through a time delay circuit.

7. A method according to claim 1, characterized in that a transmitter means and receiver means with a beam of emission or reception of 18–20° are used. receiver means of the first group is directed to intersect the optical axis or direction of the beam of the transmitter means at a distance of 0.5 to 2.0 m from the transmitter means, and the receiving direction on the receiver means of the second group is directed to intersect the optical axis or direction of the transmitter means at a distance of more than 2 m from the transmitter means.

8. Method according to claim 1, which is used for purposes of occupational safety in connection with a moving apparatus, characterized in that the receiving direction of the receiver means of the first group is directed to intersect the optical axis or direction of the beam of the transmitter means at a distance of 0.5 to 2.0 m from the transmitter means, and the receiving direction or the receiver means of the second group is directed to intersect the optical axis or direction of the transmitter means at a distance of more than 2 m from the transmitter means.

* * * * *